May 24, 1949.   C. F. ALBAN   2,470,753
THERMOSTATIC LAMINATED METAL
Filed Feb. 18, 1946
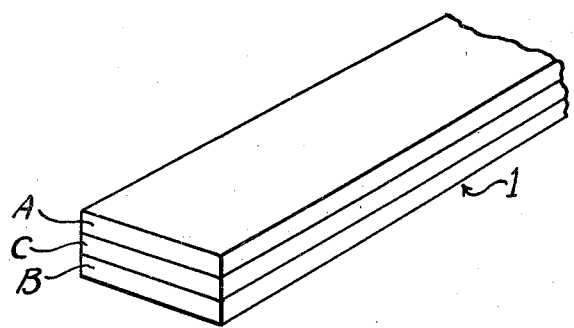
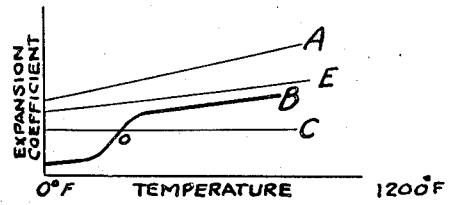
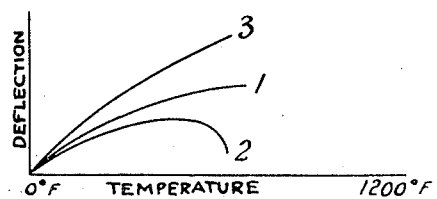
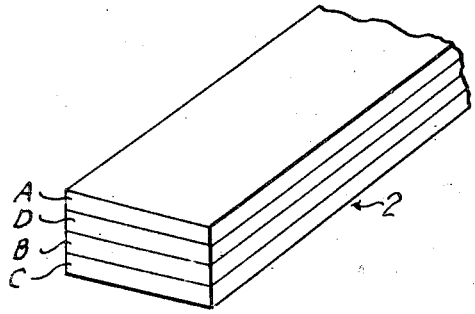
INVENTOR.
Clarence F. Alban
BY
Barnes, Kisselle, Laughlin & Raisch
ATTORNEYS Patented May 24, 1949

2,470,753

UNITED STATES PATENT OFFICE 2,470,753

THERMOSTATIC LAMINATED METAL

Clarence F. Alban, Pontiac, Mich., assignor to W. M. Chace Company, Detroit, Mich., a corporation of Michigan Application February 18, 1946, Serial No. 648,373

7 Claims. (Cl. 29—195.5)

This invention relates to thermostatic laminated metal.

It is an object of this invention to produce thermostatic laminated metal wherein the deflection properties of the laminations are correlated so as to give a controlled deflection rate over a range of temperatures.

Thermostatic laminated metal is used in electrical circuit breakers for making and breaking the circuit. Under short circuit the thermostatic laminated metal is subjected to relatively high temperatures, for example, sometimes as high as 1700° F. If the laminated thermostatic metal increases its deflection rate with increasing temperature, then the calibration, that is, the making and breaking temperature of the circuit breaker, in many instances will be changed by the circuit breaker pressing against the side of the case in which the circuit breaker is housed. Since the case prevents the laminated metal from deflecting, the laminated metal element will take a permanent set. The herein described laminated thermostatic metal will avoid such contingency or trouble because the deflection rate is either stopped or substantially decreased at any desired temperature and therefore any permanent set in the thermostatic element is prevented.

In the drawings:

Fig. 1 is a perspective showing one form of my laminated thermostatic metal.

Fig. 2 is a graph showing the thermal expansion characteristics of known metals and alloys plotted against temperature.

Fig. 3 shows three temperature deflection curves for laminated thermostatic metal.

Fig. 4 is a perspective of a modified form of my laminated thermostatic metal.

In fabricating my laminated thermostatic metal having a controlled or predetermined deflection rate over a range of temperatures, I use a high expanding lamination A of an alloy having a high coefficient of expansion and selected to give the required characteristics in the thermostatic metal. Besides the high expanding lamination A, I use at least two other laminations B and C of alloys each having a lower coefficient of expansion than lamination A throughout the entire temperature range for which my thermostatic laminated metal is designed for use and may be subjected to during use. However, laminations B and C will be made from alloys which are selected so that their coefficient expansions will intersect at some predetermined temperature, for example, if this predetermined or desired temperature is, say, 500° F., then below 500° F. lamination B will have a lower coefficient of expansion than lamination C, but above the 500° F. lamination B will have a higher coefficient of expansion than that of lamination C. Laminations B and C can be considered as laminated thermostatic bimetal and at temperatures below the point of intersection of their thermal expansion coefficients lamination C will be the high expanding lamination and lamination B the low expanding lamination, but above this point of intersection 0, the situation will be reversed; namely, lamination B will be the high expanding lamina and C the low expanding lamina.

Laminations A, B and C can be joined together in any well known manner, for example, by welding, soldering, riveting, or the like. The preferred method, of course, is by autogenous welding of laminations A, B and C together.

The exact composition or analysis of laminations A, B and C can be selected from a legion of known alloys, by way of example, lamination A can be an alloy consisting of 72% manganese, 18% copper, 10% nickel, which has an expansion temperature curve such as designated A in Fig. 2. Note that the coefficient of expansion of lamination A continuously increases with a rise in temperature and is always above the expansion coefficients of both laminations B and C. Lamination B, by way of example, can be a nickel-steel such as Invar consisting of about 36% nickel and the balance iron. Lamination C, by way of example, can be an alloy consisting of about 17% chromium, 4% aluminum, and the balance iron. The expansion coefficient of laminations B and C intersect at point 0.

The deflection rate of a thermostatic laminated metal depends in general upon the relative thickness of the several layers or laminations, the difference in their expansion coefficients, and their respective moduli of elasticity. In building a specific "bucking" thermostatic laminated metal structure, such as above described, the above factors have to be considered; for example, with a three layer material each lamination can be one-third of the total thickness. At the point of intersection of the expansion curve the expansion coefficients of laminations B and C are equal. This means that the effective low expansion layer comprising laminations B and C "bucks" double in thickness in this case which lowers the deflection rate of the laminated metal strip generally designated 1 and comprising laminations A, B and C. Above the intersection 0 the middle layer starts to "buck" and a subtraction from the total deflection is effected with increase of temperature.

If we consider laminations B and C as a separate piece of bimetal, then as the temperature rises up to the point of intersection 0, lamination C will expand faster than B. Consequently, the bimetal will curve with lamination B on the inside of the curve and lamination C on the outside, but as the temperature rises above point 0 this situation will be reversed; namely, such bimetal would reverse its curvature with lamination B on the outside of the curve and C on the inside. The deflection temperature curve of a bimetal consisting of laminations B and C is designated 2, Fig. 3. If lamination A was combined with either lamination B or C to form a bimetal, its temperature deflection curve would be such as referenced 3 in Fig. 3. Hence, when combined with lamination A, this same action takes place. Since lamination A has a higher expansion coefficient at all temperatures than both B and C, laminations B and C serve together as the effective low expansion layer or layers with respect to lamination A. At temperatures below point 0 laminations B and C will offer a greater resistance to the expansion of lamination A than at temperatures above point 0. Consequently, the deflection rate of the laminated thermostatic metal 1 will be higher up to temperature 0 than at temperatures above point 0 with a resultant curve such as referenced 1 in Fig. 3. In other words, in my structure deflection curves 2 and 3 are modified to obtain curve 1. Below the temperature at which the expansion coefficients of laminations B and C intersect, the laminated thermostatic metal 1 will have good deflection properties and at temperatures above this point 0 the deflection rate or properties of the laminated metal 1 will be slowed down or decreased.

If it is found desirable to modify the physical properties of my laminated metal, I can do so by inserting a fourth lamination D. In this case lamination D can consist of a layer of nickel which would increase the electrical conductivity of my laminated metal. Here again, laminations C and B would give the "bucking" action described above which slows down the deflection of the four layer bimetal designated 2, Fig. 4, above point 0 and lamination D would increase the thermal deflection rate of the laminated thermostatic metal 2.

My invention can be applied wherever the expansion coefficients of two alloys intersect or become equal or approach equality, i. e., become substantially equal. This means that an arrangement can be made whereby the deflection rate of the laminated structure can be modified above the intersection or at the equality point of these expansion coefficients. For example, another "bucking" type laminated thermostatic metal can be made from laminations A, E and B having the expansion coefficients shown in Fig. 2. Note that the coefficient of expansion of lamination A is always greater than the expansion coefficient of lamination E. In such case lamina A is positioned between laminations E and B. A study of Fig. 2 will clearly illustrate that as E and B approach equality the thermal deflection of the trimetal decreases in proportion. If the expansion rates of E and B become equal, no further thermostatic action would occur in this laminated structure because E and B would balance each other out (being positioned on opposite sides of lamina A) and there would be no difference in expansion coefficients or expansion rate in any of the laminations available for producing thermal deflection. In fabricating the laminated trimetal where the expansion rates or coefficients of E and B become equal or approach equality, the laminations can be fabricated from a large variety of alloys having thermal expansion curves of the type illustrated. By way of example, lamination A can be an alloy of 72% manganese, 18% copper, 10% nickel; lamination E can be an alloy of 25% nickel, 4% manganese, 71% iron; lamination B can be an alloy of 36% nickel, 64% iron. When this trimetal was used in a 15 ampere circuit breaker, lamination E comprised 20% of the total thickness, lamination A 30% of the total thickness, and lamination B 50% of the total thickness. The specific electrical resistivity was 589 ohms per circular mil foot. The expansion coefficients and electrical resistivities were correlated to give a "bucking" trimetal.

I claim:

1. Laminated thermostatic metal comprising at least three laminations joined together, said laminations each consisting of a metal or metal alloy, one of said laminations having a higher thermal coefficient of expansion than the other two laminations and the said other two laminations having coefficients of expansion which reverse their order of magnitude at a predetermined temperature.

2. Laminated thermostatic metal comprising at least three lamiations joined together, said laminations each consisting of a metal or metal alloy, one of said laminations having a higher thermal expansion rate throughout a given range of temperatures than the expansion rates of the other two laminations, and said other two laminations having thermal expansion rates the plotted curves of which intersect at a certain temperature within said given range of temperatures.

3. Laminated thermostatic metal comprising at least three laminations joined together, each lamination consisting of a metal or metal alloy, one of said laminations having a higher thermal expansion coefficient throughout a range of temperatures than the thermal expansion coefficients of the other two laminations within said range, the said other two laminations having the lower thermal expansion coefficients being characterized in that the one low expanding lamination has a higher coefficient of expansion than the other below a critical temperature within the said range and a lower coefficient of expansion above said critical temperature within said range whereby above said critical temperature a "bucking" action occurs between the two low expanding coefficients which decreases the deflection rate of the laminated thermostatic metal above said critical temperature.

4. The combination as set forth in claim 3 wherein the lamination having the highest thermal expansion coefficient is located on the outside and the lamination having the lowest thermal expansion coefficient above the critical temperature is positioned between the other two laminations.

5. Laminated thermostatic metal comprising at least three laminations joined together, one of said laminations having a higher thermal coefficient of expansion than the other two laminations and the said other two laminations having coefficients of expansion which are substantially equal at a predetermined temperature whereby the deflection rate of said thermostatic metal is less above than below said temperature.

6. Laminated thermostatic metal comprising at least three laminations joined together, said laminations each consisting of a metal or metal alloy, one of said laminations having a higher thermal expansion rate throughout a given range of temperatures than the expansion rates of the other two laminations, and said other two laminations having thermal expansion rates, the plotted curves of which are equal or approach equality at a certain temperature within said given range of temperatures whereby the deflection rate of said thermostatic metal decreases above said certain temperature.

7. The combination as set forth in claim 6 wherein the lamination having the higher thermal expansion rate is positioned between the other two laminations.

CLARENCE F. ALBAN.

REFERENCES CITED

The following references are of record in the file of this patent:

UNITED STATES PATENTS

| Number | Name | Date |
|---|---|---|
| 1,769,622 | Chace | July 1, 1930 |
| 2,240,824 | Alban et al. | May 6, 1941 |